US010600171B2

(12) United States Patent
Zhang et al.

(10) Patent No.: US 10,600,171 B2
(45) Date of Patent: Mar. 24, 2020

(54) IMAGE-BLENDING VIA ALIGNMENT OR PHOTOMETRIC ADJUSTMENTS COMPUTED BY A NEURAL NETWORK

(71) Applicant: Adobe Inc., San Jose, CA (US)

(72) Inventors: Jianming Zhang, Campbell, CA (US); Zhe Lin, Fremont, CA (US); Xiaohui Shen, San Jose, CA (US); Wei-Chih Hung, Los Angeles, CA (US); Joon-Young Lee, Milpitas, CA (US)

(73) Assignee: Adobe Inc., San Jose, CA (US)

( * ) Notice: Subject to any disclaimer, the term of this patent is extended or adjusted under 35 U.S.C. 154(b) by 158 days.

(21) Appl. No.: 15/914,659

(22) Filed: Mar. 7, 2018

(65) Prior Publication Data
US 2019/0279346 A1   Sep. 12, 2019

(51) Int. Cl.
*G06T 5/50* (2006.01)
*G06T 7/33* (2017.01)
(52) U.S. Cl.
CPC ............... *G06T 5/50* (2013.01); *G06T 7/33* (2017.01); *G06T 2207/20084* (2013.01); *G06T 2207/20221* (2013.01)
(58) Field of Classification Search
CPC ... G06T 5/50; G06T 7/33; G06T 2207/20221; G06T 2207/20084
See application file for complete search history.

(56) References Cited

U.S. PATENT DOCUMENTS

| 8,971,663 | B2* | 3/2015 | Jacobson | G06K 9/3216 |
| | | | | 382/284 |
| 2018/0253865 | A1* | 9/2018 | Price | G06K 9/4652 |
| 2018/0260668 | A1* | 9/2018 | Shen | G06N 3/084 |
| 2018/0332239 | A1* | 11/2018 | Peterson | H04N 5/272 |
| 2019/0108621 | A1* | 4/2019 | Condorovici | G06T 5/001 |
| 2019/0251401 | A1* | 8/2019 | Shechtman | G06K 9/66 |
| 2019/0295223 | A1* | 9/2019 | Shen | G06K 9/66 |

(Continued)

OTHER PUBLICATIONS

Deng, Jia, "Imagenet: A Large-Scale Hierarchical Image Database", In Computer Vision and Pattern Recognition, Jun. 2009, CVPR 2009, IEEE Conference, 8 pages.

(Continued)

*Primary Examiner* — Wesley J Tucker
(74) *Attorney, Agent, or Firm* — Kilpatrick Townsend & Stockton LLP

(57) ABSTRACT

Certain embodiments involve blending images using neural networks to automatically generate alignment or photometric adjustments that control image blending operations. For instance, a foreground image and a background image data are provided to an adjustment-prediction network that has been trained, using a reward network, to compute alignment or photometric adjustments that optimize blending reward scores. An adjustment action (e.g., an alignment or photometric adjustment) is computed by applying the adjustment-prediction network to the foreground image and the background image data. A target background region is extracted from the background image data by applying the adjustment action to the background image data. The target background region is blended with the foreground image, and the resultant blended image is outputted.

20 Claims, 7 Drawing Sheets
(5 of 7 Drawing Sheet(s) Filed in Color)

(56) References Cited

U.S. PATENT DOCUMENTS

2019/0311202 A1* 10/2019 Lee .................... G06K 9/00765

OTHER PUBLICATIONS

Gatys, Leon A, et al., "Image Style Transfer Using Convolutional Neural Networks", In Proceedings of the IEEE Conference on Computer Vision and Pattern Recognition, Jun. 2016, 10 pages.
Isola, Phillip., et al., Image-To-Image Translation With Conditional Adversarial Networks, arXiv preprint arXiv:1611.07004, 2016, reprint Nov. 2017, 17 pages.
Simonyan, Karen, et al., "Very Deep Convolutional Networks for Large-Scale Image Recognition" arXiv preprint arXiv:1409.1556, Apr. 2015, 14 pages.
Wang, Ziyu, et al., "Dueling Network Architectures for Deep Reinforcement Learning" arXiv preprint arXiv:1511.06581, Nov. 2015, reprint Apr. 2016, 15 pages.
Chen, Liang-Chieh., et al., Deeplab: Semantic Image Segmentation With Deep Convolutional Nets, Atrous Convolution, and Fully Connected CRFs, In arXiv:1606.00915v2, May 2017, 14 pages.
Shen, Xiaoyong, et al, "Automatic Portrait Segmentation for Image Stylization" In Computer Graphics Forum, vol. 35, No. 2, 2016, 10 pages.
Caicedo, Juan C., et al., "Active Object Localization With Deep Reinforcement Learning" In ICCV, Computer Vision and Pattern Recognition, Nov. 2015, 9 pages.
Chen, Qfieng, et al., "Photographic Image Synthesis With Cascaded Refinement Networks", In ICCV, Computer Vision Foundation, IEEEI International Conference, 2017, 10 pages.
Chopra, Sumit, et al., "Learning a Similarity Metric Discriminatively, With Application to Face Verification", CVPR, Computer Vision and Pattern Recognition, IEEE Computer Society Conference, Jun. 2005, 8 pages.
Christiano, Paul F., et al., "Deep Reinforcement Learning From Human Preferences", In NIPS, Neural Information Processing System, 2017, 9 pages.
Dumoulin, Vincent, et al, "A Learned Representation for Artistic Style", In ICLR, International Conference on Learning Representations, 2017, 26 pages.
Finn, Chelsea., "Guided Cost Learning: Deep Inverse Optimal Control Via Policy Optimization", ICML, International Conference on Machine Learning, 2016, 10 pages.
Gatys, Leon, A., et al., "Image Style Transfer Using Convolutional Neural Networks", In CVPR, Computer Vision Foundation, IEEE Xplore, 2016, 10 Pages.
Guzman-Rivera, Abner, "Multiple Choice Learning: Learning to Produce Multiple Structured Outputs", NIPS, Neural Information Processing System , 2012, 9 Pages.
Ho, Jonathan, et al., "Generative Adversarial Imitation Learning", NIPS, Neural Information Processing System, 2016, 9 pages.
Huang, X, et al., "Arbitrary Style Transfer in Real-Time With Adaptive Instance Normalization", CVPR, Computer Vision Foundation, IEEE Xplore, 2017, 10 pages.
Iizuka, Satoshi, et al., "Let There Be Color!: Joint End-To-End Learning of Global and Local Image Priors for Automatic Image Colorization With Simultaneous Classification", SIGGRAPH, Special Interest Group on computer Graphics and Interactive Techniques, 2016, 11 pages.
Isola, Phillip, et al., "Image-To-Image Translation With Conditional Adversarial Networks", CVPR, Computer Vision Foundation, IEEE Xplore, 2017, 10 pages.
Johnson, Justin, et al., "Perceptual Losses for Real-Time Style Transfer and Super-Resolution", Computer Vision and Pattern Recognition, 2016, 17 pages.
Kang, Le, et al., "Convolutional Neural Networks for No-Reference Image Quality Assessment", CVPR, Computer Vision and Pattern Recognition, 2014, 8 pages.
Kong, Shu., et al., Photo Aesthetics Ranking Network With Attributes and Content Adaptation, ECCV, Springer, ARxIV:1606.01621V1, Jul. 2016, 24 pages.
Larsson, Gustav, et al., "Learning Representations for Automatic Colorization", ECCV, 2016, arXiv:1603.066668v3, 2016, 29 pages.
Lee, Joon-Young, et al., "Automatic Content-Aware Color and Tone Stylization", CVPR, 2016, 9 pages.
Li, Chuan, et al., "Combining Markov Random Fields and Convolutional Neural Networks for Image Synthesis", CVPR, 2016, 8 pages.
Li, Yijun, et al., "Diversified Texture Synthesis With Feed-Forward Networks", CVPR, 2017, 9 pages.
Li, Yijun, et al., "Universal Style Transfer Via Feature Transforms", NIPS, Neural Information Processing System, 2017, 11 pages.
M.-Y. Liu, et al., "Unsupervised Image-To-Image Translation Networks", NIPS, Neural Information Processing System 2017, 9 pages.
Liu, Sifei, et al., "Learning Recursive Filters for Low-Level Vision Via a Hybrid Neural Network", ECCV, 2016, 16 pages.
Lu, Xin, et al., "Rapid: Rating Pictorial Aesthetics Using Deep Learning", ACM Multi-Media, Nov. 2014, 10 pages.
Lu, Xin, et al.,"Deep Multi-Patch Aggregation Network for Image Style, Aesthetics, and Quality Estimation", ICCV, 2015, 9 pages.
Luan, Fujun., et al., "Deep Photo Style Transfer" CVPR, 2017, 9 pages.
Mai, Long, et al., "Composition-Preserving Deep Photo Aesthetics Assessment", CVPR, 2016, 10 pages.
Volodymyr, Mnih, "ASynchronous Methods for Deep Reinforcement Learning", Computer Vision and Pattern Recognition, IEEE, 2016, 10 pages.
Mnih, Volodymyr, et al., "Human-Level Control Through Deep Reinforcement Learning" Nature 14236, 2015, 13 Pages.
Ng, Andrew, et al, "Algorithms for Inverse Reinforcement Learning" ICML, Computer Science Division, 2000, 8 pages.
Pathak, Deepak, "Context Encoders: Feature Learning by Inpainting", CVPR, Computer Vision Foundation, IEEE Xplore, 2016, 9 pages.
Ren, Jian, "Personalized Image Aesthetics", ICCV, Computer Vision Foundation, IEEE Xplore, 2017, 10 pages.
Silver, David, et al, "Mastering the Game of Go With Deep Neural Networks and Tree Search" Nature, 2016, 12 pages.
Simonyan, Karen "Very Deep Convolutional Networks for Large-Scale Image Recognition", ICLR, ARxIV:1409.1556V6, 2015, 14 Pages.
Stadle, Bradly C., "Third-Person Imitation Learning", ICLR, ARxIV:1703.01703V1, Mar. 2017, 16 Pages.
Tsai, Yi-Hsuan, et al., "Deep Image Harmonization", CVPR, Computer Vision Foundation, IEEE Xplore, 2017, 9 pages.
Tsai, Yi-Hsuan, et al., "Sky is not the limit: Semantic-aware sky replacement", SIGGRAPH, 2016, 11 pages.
Hasselt, Hado Van, et al., "Deep Reinforcement Learning With Double Q-Learning", 2016 , Proceedings of $13^{th}$ AAAI Conference on Artificial Intelligence, 7 pages.
Wang, Ziyu,, et al., "Dueling Network Architectures for Deep Reinforcement Learning", arXiv preprint arXiv:1511.06581, v3, Apr. 2016, 15 pages.
Yeh, Raymond A., et al., "Semantic Image Inpainting With Perceptual and Contextual Losses", CVPR, ARxIV:1607.07539V3, Jul. 2017, 19 pages.
Yoo, Donggeun, et al., "AttentionNet: Aggregating Weak Directions for Accurate Object Detection", ICCV, Computer Vision Foundation, IEEE Xplore, 2015, 9 pages.
Yun, Sangdoo, "Action-Decision Networks for Visual Tracking With Deep Reinforcement Learning", Computer Vision Foundation, IEEE Xplore , 2017, 10 pages.
Zhang, Richard, et al., Colorful Image Colorization, ECCV, ArXiv:1603.08511v5, Oct. 2016, 29 pages.
Zhang, Richard, et al., "Real-Time User-Guided Image Colorization With Learned Deep Priors", SIGGRAPH, ARxIV:1705.02999v1, May 2017, 11 pages.

(56) References Cited

OTHER PUBLICATIONS

Zhu, Jun-Yan, et al. "Unpaired Image To-Image Translation Using Cycle-Consistent Adversarial Networks", ICCV, Computer Vision Foundation, IEEE Xplore , 2017 10 pages.

* cited by examiner

IMAGE-BLENDING VIA ALIGNMENT OR PHOTOMETRIC ADJUSTMENTS COMPUTED BY A NEURAL NETWORK

TECHNICAL FIELD

This disclosure relates generally to machine-learning systems that transform an image to enhance its visual quality by selectively combining the image's content with content from other images. More specifically, but not by way of limitation, this disclosure relates to blending images using alignment or photometric adjustments computed by a neural network trained for improving blending quality.

BACKGROUND

Image manipulation applications are often used to combine content from multiple images. For example, FIG. 1 depicts an example of blending foreground images with background images. In this example, a blending workflow 104*a*, which could include various actions performed with an image manipulation application by an artist, combines semantic content from a foreground image 102 and a background image 106 and thereby generates a blended image 108. In this example, an image manipulation application could implement the blending workflow 104*a* by receiving various user inputs from an artist that select a particular portion of the background image (e.g., the grass and sky in the center of the image) and align the selected image portion with a desirable portion of the foreground image 102 (e.g., the woman depicted in the center of the image). The image manipulation application blends the image content together based on these manual inputs. But this blending workflow 104*a* is often time-consuming and subject to user errors with respect to filtering, positioning, and masking the foreground image 102 and a background image 106.

Certain existing solutions could partially automate this image blending workflow. For example, an image manipulation application could execute one or more action scripts that implement a series of commands that would otherwise be performed manually within a user interface of the image manipulation applications. But these action scripts are often limited to photometric adjustment actions (e.g., changes in contrast, brightness, etc.), and do not automatically adjust the positions of the images to be blended or adapt to image characteristics.

These deficiencies could result in sub-standard blending outputs. For instance, in the blending workflow 104*b*, a failure to properly align relevant portions of a foreground image 110 and a background image 112 results in an aesthetically undesirable blended image 114. The blended image 114 fails to preserve relevant semantic content from 110 by, for example, blocking most of the upper half of the depicted woman. Furthermore, the blended image 114 includes a sharp change in color scheme halfway through the image that does not enhance the aesthetic quality of the blended image 114.

Therefore, existing solutions for blending images present disadvantages such as (but not limited to) those described above.

SUMMARY

Certain embodiments involve blending images using neural networks to automatically generate alignment or photometric adjustments that control image blending operations. For example, a foreground image and a background image data are provided to an adjustment-prediction network that has been trained, using a reward network, to compute alignment or photometric adjustments that optimize blending reward scores. An adjustment action (e.g., an alignment or photometric adjustment) is computed by applying the adjustment-prediction network to the foreground image and the background image data. A target background region is extracted from the background image data by applying the adjustment action to the background image data. The target background region is blended with the foreground image, and the resultant blended image is outputted.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
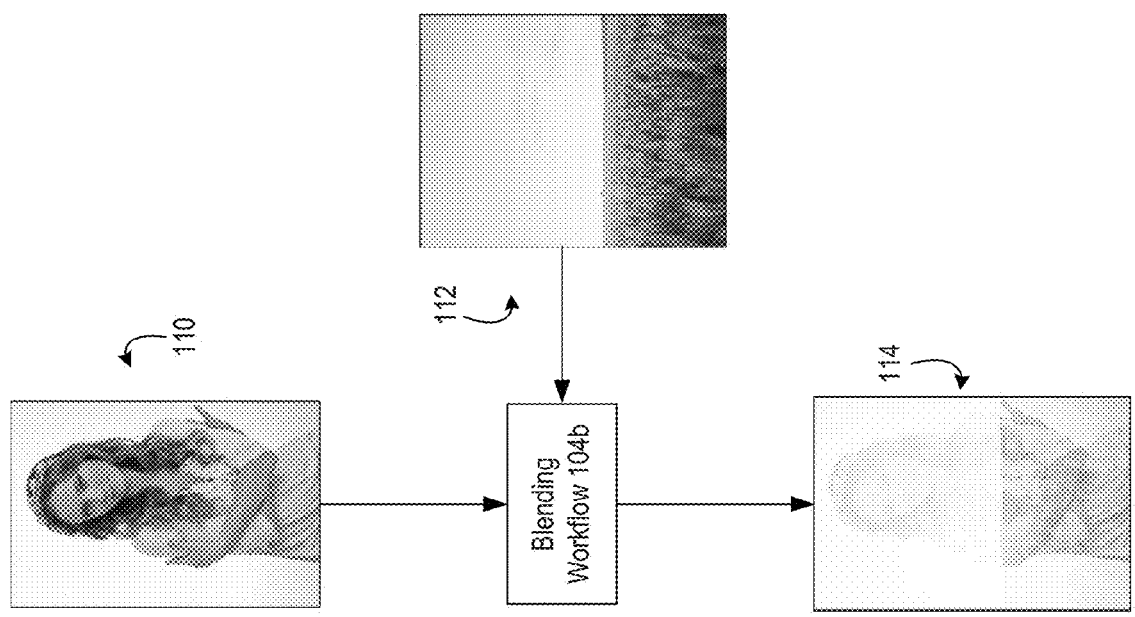
FIG. 1 depicts an example of blending foreground images with background images.
Figure 1:
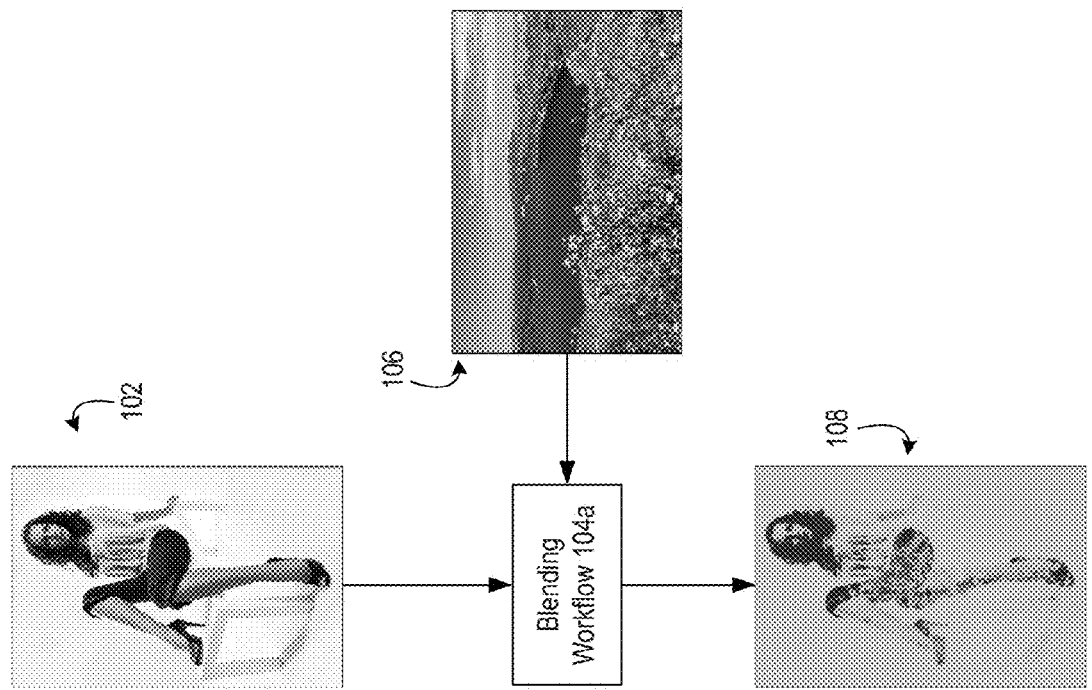

Certain embodiments involve using an adjustment-prediction network to automatically generate alignment or photometric adjustments that are applied to background images in an image blending process. For instance, the adjustment-prediction network (e.g., a policy network) is trained to compute changes in a background image's alignment with a foreground image (i.e., alignment adjustments), changes in brightness or contrast of the background image could be modified (i.e., photometric adjustments), or both. The adjustment-prediction network is trained to predict these adjustments based on whether they will result in a higher quality, as determined by a separate reward network model, of a resulting blended image. Thus, rather than simply using scripts to automate manual tasks, certain embodiments described herein use neural network models to automatically analyze image content from foreground and background images and thereby extract a set of background image data that results in an optimal (or otherwise desirable) blending result.

The following non-limiting example is provided to introduce certain embodiments. In this example, an image manipulation application accesses a foreground image and background image data. The background image data includes or is computed from a background image. For instance, the background image data could include an initial blended image that is generated by blending the foreground image with a target background region, where the target background region is a portion of a background image specified by a default or user-defined bounding box. The image manipulation application provides the foreground image and the background image data to an adjustment-prediction network. The adjustment-prediction network is a neural network model that has been trained to compute adjustments to alignment or photometric properties that will optimize a blending reward score. The blending reward score is generated by a reward network, which is a separate neural network model that is trained to evaluate the quality of an image blending result. Examples of a quality of an image blending result include an amount of semantic content from a foreground image that is preserved in a corresponding blending image, a difference between the foreground image and a corresponding blending image (i.e., how interesting the blended image is as compared to the foreground image), or both.

Continuing with this example, the image manipulation application computes an adjustment action by applying the adjustment-prediction network to the foreground image and the background image data. The adjustment action involves an alignment adjustment with respect to the background image data (e.g., changes in a bounding box), a photometric adjustment with respect to the background image data (e.g., changes in contrast or brightness), or both. Because the adjustment-prediction network has already been trained, using the reward network, to identify which adjustment actions (e.g., changes in alignment or photometric properties) result in higher blending quality, the adjustment-prediction network can predict an adjustment for the input foreground image and background image data without having to directly apply the reward network to an image blending operation involving these images. The image manipulation application extracts a target background region from the background image data by applying the adjustment action to the background image data. For instance, the image manipulation application modifies a position or size of an initial bounding box, modifies a photometric property of background image content within an initial bounding box, or both. The image manipulation application blends the resulting target background region with the foreground image and outputs a blended image generated by blending the target background region with the foreground image.

As used herein, the term "reward network" is used to refer to a neural network model that computes a blending quality metric (i.e., a blending reward) from a foreground image and a blended image generated from the foreground image. The reward network receives the foreground image and the blended image as inputs. The reward network computes one or more scores indicating a quality of the blended image. The scores indicating the quality of the blended image can correspond to user-provided training scores that are utilized for training the reward network. For instance, if a particular image pair includes a foreground image and a blended image with characteristics similar to a training image pair that users labeled as a "good" blending quality, the reward network can predict that the particular image pair would also be labeled with a "good" blending quality.

As used herein, the term "adjustment-prediction network" is used to refer to a neural network model, such as a policy network, that receives foreground image data and background image data as inputs and outputs data identifying one or more adjustment actions. The adjustment actions can be implemented in a blending operation or other editing operation performed by an image manipulation application.

The adjustment-prediction network is trained using one or more reward networks. For instance, in a training process, the adjustment-prediction network encounters a training foreground image and a training background image. The adjustment-prediction network iteratively computes different alignment or photometric adjustments for different blending operations involving the foreground image and the training background image, where each blended image resulting from these adjustments is scored with the reward network. The adjustment-prediction network is adjusted, through the training process, to select alignment or photometric adjustments that result in desirable blending rewards. Thus, if the trained adjustment-prediction network encounters a foreground image and a background image with characteristics similar to the training foreground image and the training background image, the adjustment-prediction network predicts which adjustments would result in a high quality blending result.

As used herein, the term "alignment adjustment" is used to refer to changes in a size or position of a bounding box used to identify a target background region (i.e., a portion of a background image to be blended with the foreground image). The alignment adjustment can include moving the bounding box in one or more directions, increasing or decreasing one or more dimensions of the bounding box, or some combination thereof.

As used herein, the term "photometric adjustment" is used to refer to changes in one or more color properties of image content. Examples of photometric adjustment include changes in contrast, changes in brightness, etc.

As used herein, the term "blending" is used to refer to any image-processing operation that combines semantic content from a foreground image with semantic content from a background image. In some embodiments, blending involves identifying a pixel value for a particular location from a foreground image, a pixel value for a corresponding location from a background image, and transforming the pixel values into a blended pixel value via one or more suitable mathematical operations.

As used herein, the term "image" is used to refer to graphical content from a photograph, a drawing, or some combination thereof. Any set of graphical content items (i.e., a foreground image or other graphic and a background image or other graphic) can be automatically blended in accordance with one or more embodiments described herein.

Figure 2:
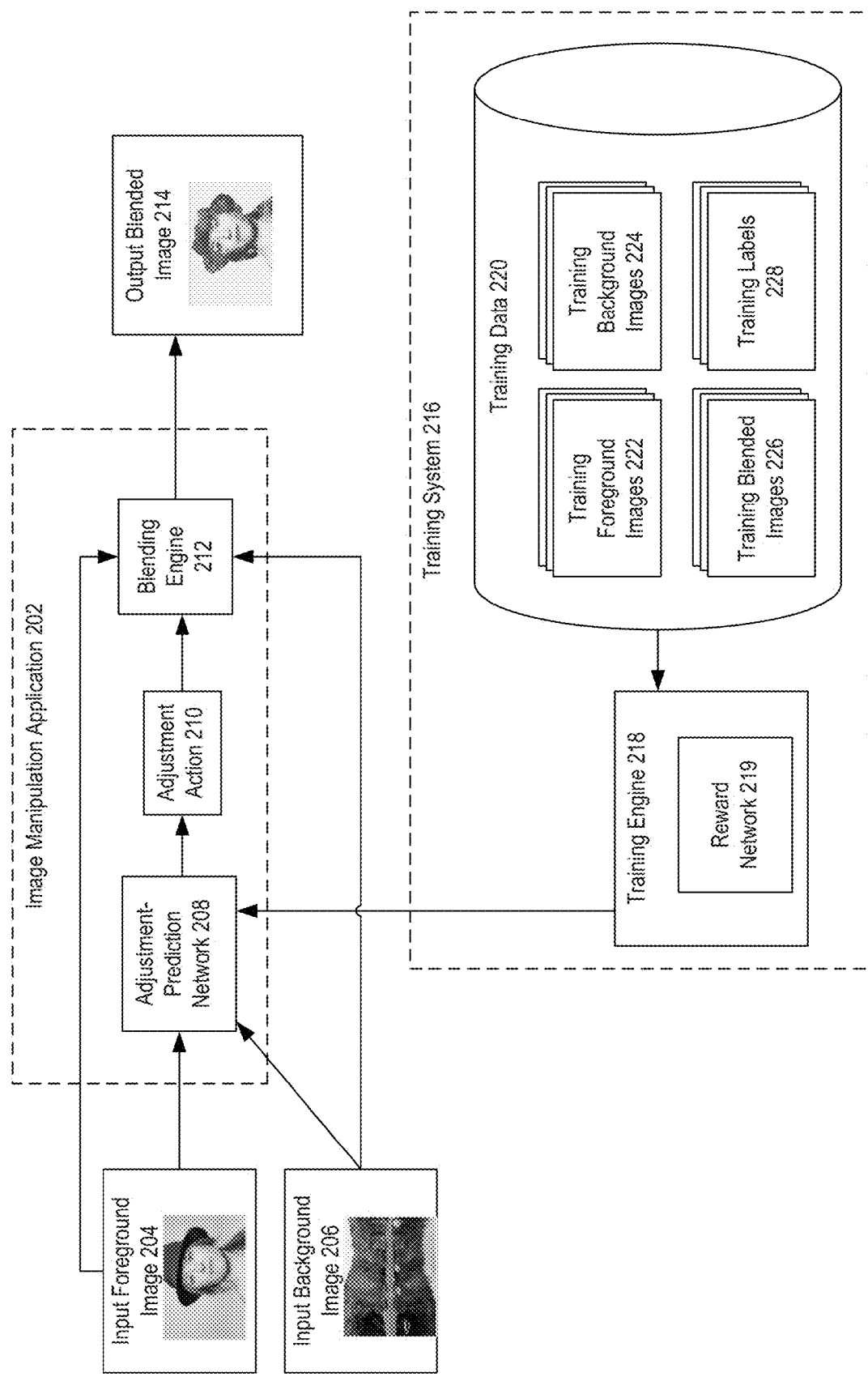
FIG. 2 depicts an example of a computing environment for using automatically generated alignment or photometric adjustments to control image blending operations, according to certain embodiments of the present disclosure.

Example of an Operating Environment for Automatically Generating Alignment or Photometric Adjustments to Control Image Blending Operations Referring now to the drawings, FIG. 2 depicts an example of a computing environment for using automatically generated alignment or photometric adjustments to control image blending operations. The computing environment includes an image manipulation application 202, which is executed by one or more computing devices. The image manipulation application 202 includes one or more adjustment-prediction networks 208 and a blending engine 212.

An adjustment-prediction network 208 is trained, using a reward network 219, to automatically generate one or more adjustment actions 210 from an input foreground image 204 and an input background image 206 received by the image manipulation application 202. Examples of an adjustment action 210 include alignment adjustments, photometric adjustments, or both. For instance, the adjustment-prediction network 208 predicts a target background region and one or more photometric adjustment parameters that could generate a sufficient blending reward score (e.g., a highest score) if the predicted target background region and photometric adjustment parameters were used for a blending operation and the trained reward network 219 was applied to the blended image outputted by the blending operation.

The image manipulation application 202 also provides the input foreground image 204 and the input background image 206 to a blending engine 212. The blending engine 212 applies the adjustment action 210 to the input background image 206 to perform one or more blending operations. The adjustment action 210 is used to extract background image content for blending. This extraction can involve selecting and, in some cases, modifying a region of the input background image 206. For instance, an alignment adjustment could move a bounding box over a certain region of the input background image 206, and a photometric adjustment could change the brightness or contrast of this region of the input background image 206.

The blending engine 212 generates an output blended image 214 by applying one or more image blending operations to the input foreground image 204 and a region of the input background image 206 that has been extracted using the adjustment action 210. For instance, the image manipulation application 202 performs the image blending in an efficient manner that provides a perceptually desirable quality in the resulting blended images. The output blended images 214 can be used for a wide range of applications, such as automatic blending generation, dynamic content blending (videos), and automatic light source composition.

In some embodiments, the computing environment also includes a training system 216. The training system 216 includes one or more computing devices that execute a training engine 218 and one or more memory devices that store training data 220. One or more training engines 218 are used to train the adjustment-prediction network 208. This training process involves using a deep reinforcement learning agent to train one or more adjustment-prediction networks to select a background alignment parameter, a photometric adjustment, or both. In some embodiments, the deep reinforcement learning agent uses one or more reward networks 219 to evaluate how well the adjustment-prediction network 208 selects these parameters for various subsets of training foreground images 222, training background images 224, and corresponding training blended images 226. Examples of training the adjustment-prediction network 208 are described herein with respect to FIG. 6.

In some embodiments, one or more training engines 218 are also used to train the reward network 219. This process involves training a reward network 219 to evaluate the aesthetic quality of blending images with human preference annotations on random blending photos. For instance, the training engine 218 selects one or more training foreground images 222, one or more training blended images 226 that correspond to the selected training foreground images 222, and one or more training labels 228 that identify a blending quality for the selected training blended images 226. The reward network 219 outputs a blending reward score (e.g., a scalar value) that indicates one or more perceptual qualities of a training blended image 226.

Any suitable perceptual qualities of a training blended image 226 can be represented by a blending reward score. In one example, the blending reward score can indicate a degree to which the blended image preserves semantic content of the foreground image. In one example, the blending reward score can indicate a degree to which the blended image is different from the original image (e.g., how interesting the blended image is). The training process involves adjusting the reward network 219 to output blending reward scores that are consistent with the training labels 228 for the selected training blended images 226. Examples of training the reward network 219 are described herein with respect to FIGS. 4 and 5.

Examples of Using Adjustment-prediction Networks for Image Blending

Figure 3:
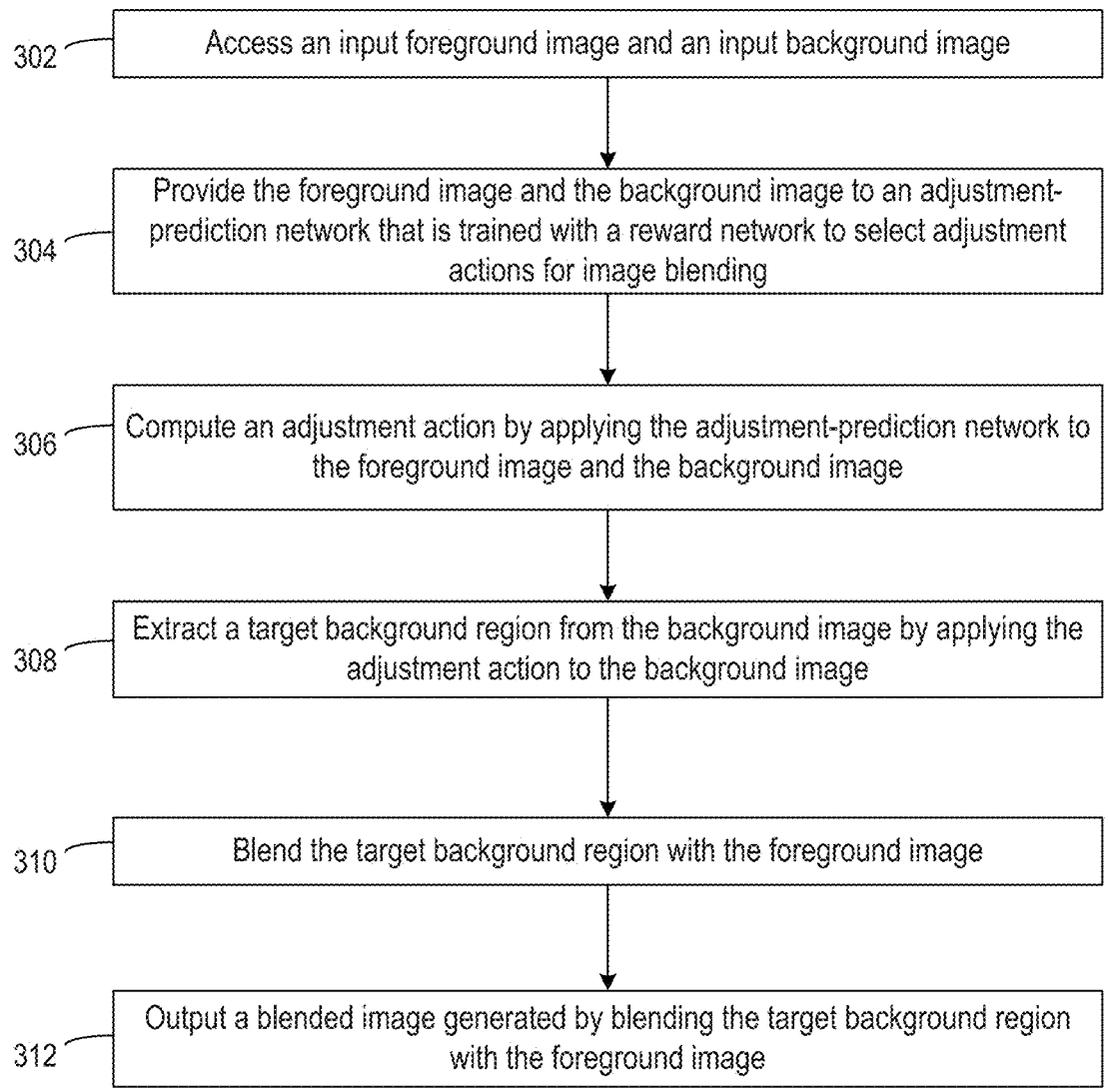
FIG. 3 depicts an example of a process for performing an image blending operation with alignment or photometric adjustments generated by the adjustment-prediction network of FIG. 2, according to certain embodiments of the present disclosure.

FIG. 3 depicts an example of a process 300 for performing an image blending operation with alignment or photometric adjustments generated by the adjustment-prediction network 208. One or more processing devices implement operations depicted in FIG. 3 by executing suitable program code (e.g., the image manipulation application 202). For illustrative purposes, the process 300 is described with reference to certain examples depicted in the figures. Other implementations, however, are possible.

At block 302, the process 300 involves accessing an input foreground image and an input background image. One or more processing devices execute the image manipulation application 202 (or suitable other program code) to implement block 302. For instance, executing the image manipulation application 202 causes one or more processing devices to access an input foreground image 204 and an input background image 206 that are stored in a non-transitory computer-readable medium. In some embodiments, accessing the input foreground image 204 and the input background image 206 involves communicating, via a data bus, suitable signals between a local non-transitory computer-readable medium and the processing device. In additional or alternative embodiments, accessing the input foreground image 204 and the input background image 206 involves communicating, via a data network, suitable signals between a computing system that includes the non-transitory computer-readable medium and a computing system that includes the processing device.

At block 304, the process 300 involves providing the foreground image and the background image to an adjustment-prediction network that is trained with a reward network to select adjustment actions for image blending. For instance, block 304 could use an adjustment-prediction network 208 that is trained, with a reward network, to compute one or more of training alignment adjustments and training photometric adjustments that optimize a training blending reward score, where the training blending reward score is computed by applying the reward network to an image blending result from training foreground and background images. One or more processing devices execute the image manipulation application 202 or other program code to implement block 304. Executing the image manipulation application 202 causes the processing device to identify an adjustment action 210 having one or more changes with respect to foreground image and background image so that a blended image generated from these inputs has a sufficiently high score computed by the reward network 219. Examples of these changes include one or more of changes in alignment between foreground image and background image, changes in scale with respect to foreground image and background image, changes in brightness within the background image, changes in contrast within the background image, etc.

In some embodiments, the image manipulation application 202 also provides an initial blended image and a background context region to the adjustment-prediction network 208. For instance, the image manipulation application 202 could identify an initial bounding box that selects a portion of the input background image 206. The initial bounding box could have one or more of a default position, a default size, a position specified by a user input (e.g., a clicked point on the background image), a size specified by a user input (e.g., a dragging input or text input), etc. The image manipulation application 202 can generate an initial blended image without applying adjustments with respect to the bounding box or the target background region from the input background image 206. The image manipulation application 202 can generate a background context region by selecting a portion of the input background image 206 that is larger than the target background region specified by the initial bounding box and that encompasses some or all of the target background region.

At block 306, the process 300 involves computing an adjustment action by applying the adjustment-prediction network to the foreground image and the background image. For instance, an adjustment action 210 could include one or more of an alignment adjustment and a photometric adjustment with respect to the background image. One or more processing devices execute the image manipulation application 202 or other program code to implement block 306. Executing the image manipulation application 202 causes the processing device to compute feature vectors representing the foreground and background images and to apply one or more classifiers to these feature vectors.

In some embodiments, the adjustment-prediction network 208 is a policy network that receives the input foreground image 204 and background image data as input values for state variables. The background image data includes one or more of the input background image 206, the initial blended image generated from the input background image 206, and a background context region corresponding to the initial blended image generated from the input background image 206. In one example, a first subnetwork of the adjustment-prediction network 208 encodes the input foreground image 204 as a foreground feature vector. One or more additional subnetwork of the adjustment-prediction network 208 encodes the background image data as background feature vectors (e.g., two feature vectors for the initial blended image and the background context region). A middle layer connected to the first and second subnetworks concatenates the foreground feature vector and the background feature vector into a common feature vector. The middle layer provides the common feature vector to a classifier layer. The classifier layer is configured to compute a set of adjustment values for the common feature vector that are similar to adjustment values that were computed, during a training process for the adjustment-prediction network 208, from a similar common feature vector.

For instance, the adjustment-prediction network 208 could be trained on a set of potential actions such as [Right, Left, Up, Down, Bigger, Smaller, Increase Brightness, Decrease Brightness, Increase Contrast, Decrease Contrast]. A set of adjustment values [0.5, 0, 0.5, 0, 0, 0, 0.5, 0, 0, 0] corresponds to a rightward movement, an upward movement, and a brightness increase, with no movements left or downward, no changes in contrast, and no changes in scale. In one example, the set of adjustment values corresponds to available adjustment actions for a particular blending engine 212. In this example, the ranges of values for the different actions could correspond to the blending engine 212 (e.g., maximum brightness or contrast changes).

In some embodiments, the image manipulation application 202 also receives an identification of a preference mode for the blending operation. Different types of users could have different preferences on what constitutes a high-quality or low-quality blending result. The adjustment-prediction network 208 can be trained to account for these different preferences when selecting an adjustment action. In a simplified example, a first preference mode may emphasize content preservation with respect to a foreground image, and a second preference mode may emphasize aesthetic distinctiveness in the blending result (i.e., how distinct the blended image is as compared to the foreground image). If the image manipulation application 202 receives an input or other indication of the first preference mode, the adjustment-prediction network computes one or more adjustment actions 210 (for a particular foreground image and background image) that preserve a larger amount of semantic content from the foreground image. If the image manipulation application 202 receives an input or other indication of the second preference mode, the adjustment-prediction network computes one or more adjustment actions 210 (for the same foreground image and background image) that emphasize aesthetic distinctiveness in the image blending result, even if doing so preserves a smaller amount of semantic content from the foreground image. In various embodiments, a particular preference mode can be identified via user inputs received by the image manipulation application 202, predicted by the image manipulation application 202 based on prior user interactions with the image manipulation application 202, or some combination thereof.

The preference mode can be treated as another feature to be encoded by the adjustment-prediction network 208 (i.e., a state variable in a policy network). For instance, using the example above, a selected preference mode can be one-hot encoded and concatenated with the foreground feature vector and the background feature vector into a common feature vector at the middle layer connecting the various subnetworks. A classifier layer can account for the additional information provided by the common feature vector (i.e., the concatenated foreground feature vector, background feature vector, and one-hot encoded preference) when computing the adjustment action 210.

At block 308, the process 300 involves extracting a target background region from the background image by applying the adjustment action to the background image. One or more processing devices execute the image manipulation application 202 or other program code to implement block 308. Executing the image manipulation application 202 causes the processing device to identify one or more adjustments to the background image and generate a target background region in accordance with the identified adjustments.

For instance, the adjustment action could specify a size of a bounding box to be applied to the background image and a position on the background image at which the bounding box is to be placed. The image manipulation application 202 extracts the target background region by applying the bounding box, with the specified size and position, to the input background image 206 and removing background image content outside the bounding box. Additionally or alternatively, the adjustment action could indicate a change in one or more color aspects of the target background region, such as modifying the brightness or contrast of the target background region with respect to the input background image 206. The image manipulation application 202 extracts the target background region by performing this brightness or contrast modification on the target background region.

At block 310, the process 300 involves blending the target background region with the foreground image. One or more processing devices execute the blending engine 212 or other program code to implement block 310. Executing the image manipulation application 202 causes the processing device to retrieve the input foreground image 204, the input background image 206, and the adjustment action 210 from a memory device and apply a blending operation using this retrieved data. The pixel blending operation could identity two pixel values from, respectively, the input foreground image 204 and a target background region that is generated by applying the adjustment action 210 to the input background image 206 (e.g., cropping the input background image 206 and aligning the input background image 206 with the input foreground image 204). The pixel blending operation could transform the two pixel values into a blended pixel of the output blended image 214. This pixel blending operation is applied to some or all of the pixel pairs (i.e., a foreground pixel and a background pixel) from the input foreground image 204 and a target background region. Examples of pixel blending functions include mathematical functions (e.g., add, subtract, or multiply).

Another example of a pixel blending operation is the double exposure blending variant, in which the blending mode is called "Screen." This blending function can be formulated as:

$$c = 1 - (1-a)\cdot(1-b). \quad (1)$$

In Equation (1), a and b are two pixels of the same location from the input foreground image 204 and a target background region, and c is the "Screen" blended pixel values. In this example, the pixel range of values is [0, 1]. The function from Equation (1) is applied to multiple color channels independently. In Equation (1), the resulting value of a blended pixel can be bright (1.0) if either the foreground pixel or background pixel is close to 1.0. Since in most cases the foreground photos are brighter, the overall effect could be seen as the dark parts of the foreground replaced by the background.

In some embodiments, the blending engine 212 executes a deterministic blending operation that includes pre-processing, pixel blending, and post-processing. Examples of pre-processing and post-processing include arbitrary filtering, styling, and enhancement operations, such as applying filters and background removal techniques to the input foreground image 204. For instance, the blending engine 212 could apply CNN-based background removal on the input foreground image 204, colors the "removed" regions as white, detects the sky color in the target background region with a scene parsing model, and applies the detected color on the removed regions of foreground image after the background removal. Various other filters can also be applied (e.g., transforming the result blending image to grayscale).

At block 312, the process 300 involves outputting a blended image generated by blending the target background region with the foreground image. One or more processing devices execute the image manipulation application 202 or other program code to implement block 312. In some embodiments, the image manipulation application 202 configures (or otherwise causes) a presentation device to display the output blended image 214. In one example, a processing device could communicate, via a data bus, suitable signals between a local non-transitory computer-readable medium and a display device that cause the display device to render the output blended image 214. In another example, a processing device could communicate via a data network, signals between a computing system that includes a non-transitory computer-readable medium storing the blending image 214 and a computing system that includes the display device, where the signals cause the display device to render the output blended image 214. In additional or alternative embodiments, the image manipulation application 202 provides the output blended image 214 to one or more other applications for further processing.

Example of Reward Network Trained to Facilitate Image Blending

Figure 4:
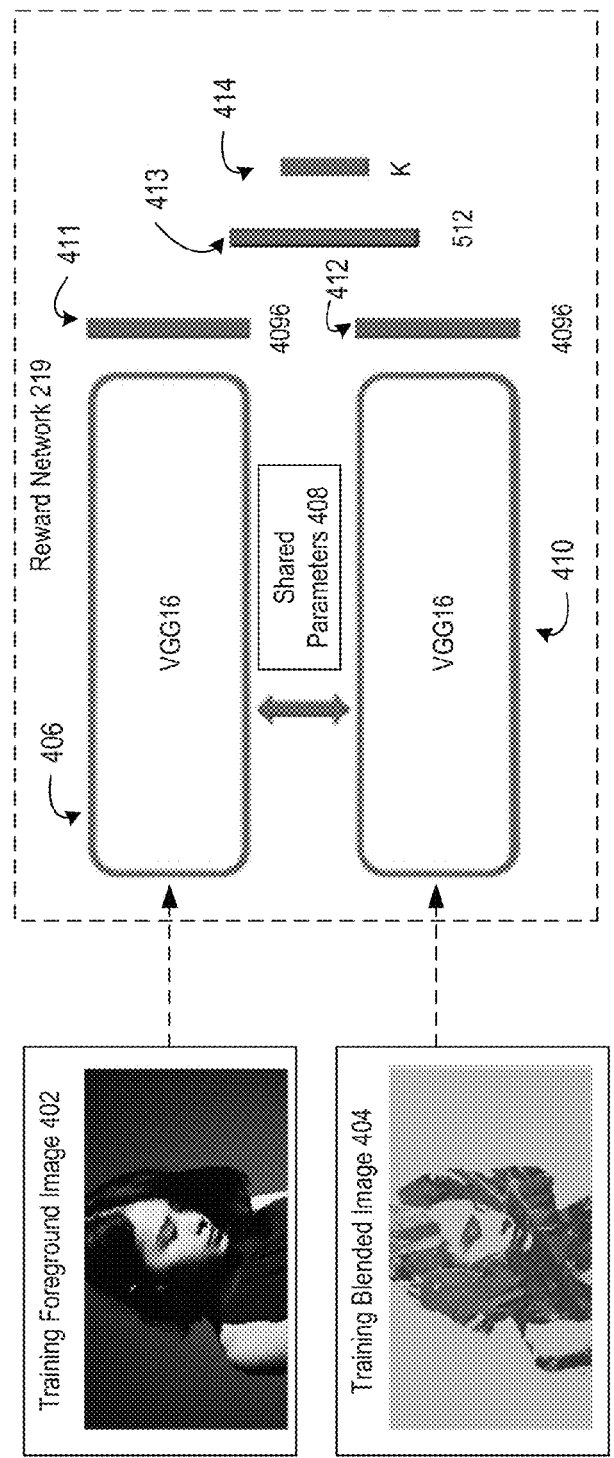
FIG. 4 depicts an example of a reward network used to train the adjustment-prediction network of FIG. 2, according to certain embodiments of the present disclosure.

FIG. 4 depicts an example of a reward network 219 that is used to train the adjustment-prediction network 208. This example of a reward network 219 includes a set of two VGG networks 406, 410 that are trained with shared weights or other shared parameters 408. In this example, the reward network is constructed by removing a classifier layer (e.g., the final classifier layer) from the VGG networks 406, 410. The features 411 and 412 (e.g., 4096-dimension feature vectors) outputted by the VGG networks 406, 410 are concatenated. Two fully-connected layers (i.e., a as a middle layer 413, such as 512-channel layer) and a classifier layer 414 that output a K dimensional vector), are added to the VGG networks 406, 410. In the example depicted in FIG. 4, the reward network 219 receives, as inputs, a training foreground image 402 and a training blended image 404 (both of which are downsized to 224×224). The reward network 219 outputs a set of K scalar values as blending reward scores, where K≥1.

During training of the reward network 219, the training engine 218 provides a set of training foreground images 402 and a set of training blended images 404 to the reward network 219. A loss function is used to optimize weights or other parameters of the reward network 219.

Figure 5:
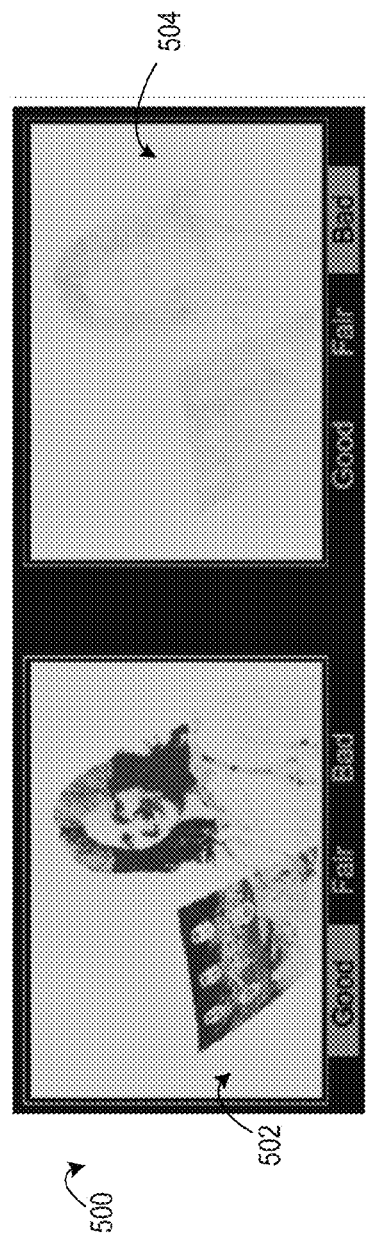
FIG. 5 depicts an example of an interface for generating labels that indicate a blending quality for training images and that are used for training the reward network of FIG. 4, according to certain embodiments of the present disclosure.

In some embodiments, the training engine 218 trains the reward network 219 with user preferences indicated by more training labels. Training labels are generated via a labeling process. For instance, FIG. 5 depicts an example of an interface 500 for generating training labels used for training the reward network 219. In one example of a labeling process, randomly blended images and corresponding foreground image are shown to users via the interface 500 (or other suitable labeling system). The interface 500 prompts users to label each blended image with a preference score with respect to content preservation score or aesthetics (e.g., interestingness). The preference score could be, for example, three levels (e.g., good, fair, bad). In the example depicted in FIG. 5, the blended image 502 (which preserves semantic content of the foreground image) is labeled with a "good" preference score, and the blended image 504 (in which semantic content of the foreground image is barely visible) is labeled with a "bad" preference score.

The training engine 218 uses preference scores from the training labels to train each reward network 219. For instance, given a first training blended image $B_i$ and a corresponding first training foreground image $F_i$, as well as a second training blended image $B_j$ and a corresponding training second foreground image $F_j$, the training engine 218 learns a mapping function S( ) between the foreground and background images. In this example, the mapping function S maps $(F_i, B_i)$ and $(F_j, B_j)$ to two respective training reward scores for $(F_i, B_i)$ and $(F_j, B_j)$.

An objective of the training process is that the blending reward score indicates a similar rating as compared to preference scores in the training labels. For instance, if the training labels indicate that a training blended image $B_i$ is more visually pleasing (or has some other user-rated characteristic) as compared to training blended image $B_j$, the learned mapping function S( ) results in the following:

$$S(F_i,B_i)>S(F_j,B_j). \qquad (1)$$

The training engine 218 uses a ranking loss $L_r(\ )$ as a training loss function. An example of a training loss function is $$L_r(S_i,S_j)=\max\{0, -y(S_i-S_j)+m\}. \qquad (2)$$

In Equation (2), m is a margin term. The term y is equal to 1 if $S_i$ has a better annotated rating than $S_j$, and is otherwise equal to −1. The margin term can ensure the generalization ability of the system, where a larger margin indicates that the separation in the data space has lower risk of making mistakes. For instance, the margin term in certain embodiments is constant (e.g., having a value of 1).

Using only ranking loss could only enforce relative rankings between different images (e.g., where the scores of "good" examples are higher than the "fair" or "bad" example) without providing a standardized scoring scheme in which a particular score for an image indicates that the image would be considered "good" rather than merely better than others. In some embodiments, to provide such a standardized scoring scheme, the training engine 218 uses a binary cross entropy loss function to enforce that all "bad" examples of images have scores that are less than a certain threshold (e.g., a score less than zero). An example of a binary cross entropy loss function is:

$$L_{bce}(S_i)=-r\log(\sigma(S_i))-(1-r)\log(1-\sigma(S_i)). \qquad (3)$$

In this example, r=1 if the user labeling is "good" or "fair," r=0 if the user labeling is "bad." The term σ is a sigmoid function, where σ(x)=1/(1+exp(−x)).

The training engine 218 trains the reward network 219 with both the ranking and standardized scoring characteristics. For example, the overall optimization objective for the training is $L=L_r+\lambda L_{bce}$, where both the ranking property from Equation (2) and the standardized scoring scheme from Equation (3) are preserved. The weight λ applied to the binary cross entropy loss function can normalize the binary cross entropy loss with respect to the ranking loss. In some embodiments, the weight λ can be set to 1.

The impact of the ranking and standardized scoring characteristics can be analyzed in any suitable manner to obtain an overall optimization objective for the training. In the example provided above, the training engine 218 linearly combines $L_r$ and $L_{bce}$ to obtain the overall loss L. In another example, the training engine 217 takes the maximum or minimum of $L_r$ and $L_{bce}$ as the overall loss L. In some embodiments, the reward network 219 applies a hard threshold on one of the $L_r$ and $L_{bce}$ so that images of low quality with respect to that score will be rejected.

In some embodiments, the reward network 219 is configured to output multiple blending reward scores (i.e., K>1) instead of a single blending reward score. Outputting multiple blending reward scores can, for example, account for the fact that preferences between different annotators are distinct. For instance, different individuals may have different preferences that are reflected in different preference scores for the same training images. To do so, a classifier layer that outputs multiple scores is used to construct the example of the reward network 219 depicted in FIG. 4. Each of these classifier layers corresponds to a different preference model and is trained using a different subset of training data. For instance, the training process is performed using an assumption that, within a set of predefined K preference modes, a particular one of the preference modes could best describe the preference of a current rating. The reward network 219 is optimized with respect to the selected preference mode.

To do so, the training engine 218 (or other suitable software) groups the training labels 228 into clusters, where each cluster corresponds to a respective preference mode. In a simplified example, if a first set of training labels from different users indicates that a particular training blended image 226 has a "good" quality and a second set of training labels from different users indicates that the same training blended image 226 has a "fair" quality, the first set of training labels is assigned to a first cluster and the second set of training labels is assigned to a second cluster. Any suitable clustering algorithm may be used to generate the clusters. For instance, a particular set of training labels for a particular set of training blended images can be represented as a vector in a multi-dimensional space. A particular cluster includes a set of nearest-neighbor points in the multi-dimensional space.

If a particular training label is associated with a particular point within a cluster (e.g., the training label is in the set of labels represented as a vector defining the point), the particular training label is assigned to a preference mode corresponding to that cluster. The reward network 219 is trained on that preference mode using the training labels assigned to that cluster.

In one example, to account for multiple preference modes, the training engine 218 is configured with the following ranking loss function:

$$L_r^K(S_i,S_j)=\max\{0, -y(S_i^k-S_j^k)+m\}. \qquad (4)$$

In Equation (4), $k=\arg_k\max y(S_i^k-S_j^k)$ is the mode index that most closely agrees with the user rating out of the available K modes. $S_i=\{S_i^1, S_i^2, \ldots S_i^K\}$ represents the scores of K modes generated by the multiple-choice reward network 219 (i.e., a reward network 219 with K classifier layers) having $(F_i,B_i)$ as inputs.

Training the multiple-choice reward network 219 can involve applying a modified binary cross entropy loss. An example of a modified binary cross entropy loss is:

$$L_{bce}(S_i)=-r\log(\sigma(S_i^k))-(1-r)\log(1-\sigma(S_i^k)). \qquad (5)$$

In a simplified example, a first set of training labels obtained from user ratings could identify a particular image as a "Good" blend, and a second set of training labels obtained from user ratings could identify the particular image as a "Fair" blend. The training engine 218 uses the first set of training labels for training the reward network 219 to output, via a classifier layer 414, blending reward scores that indicate "Good" blends according to a first preference model for the first set of training labels. The training engine 218 uses the second set of training labels for training the reward network 219 to output, via a classifier layer 414, blending reward scores that indicate "fair" blends according to a second preference model for the second set of training labels.

Figure 6:
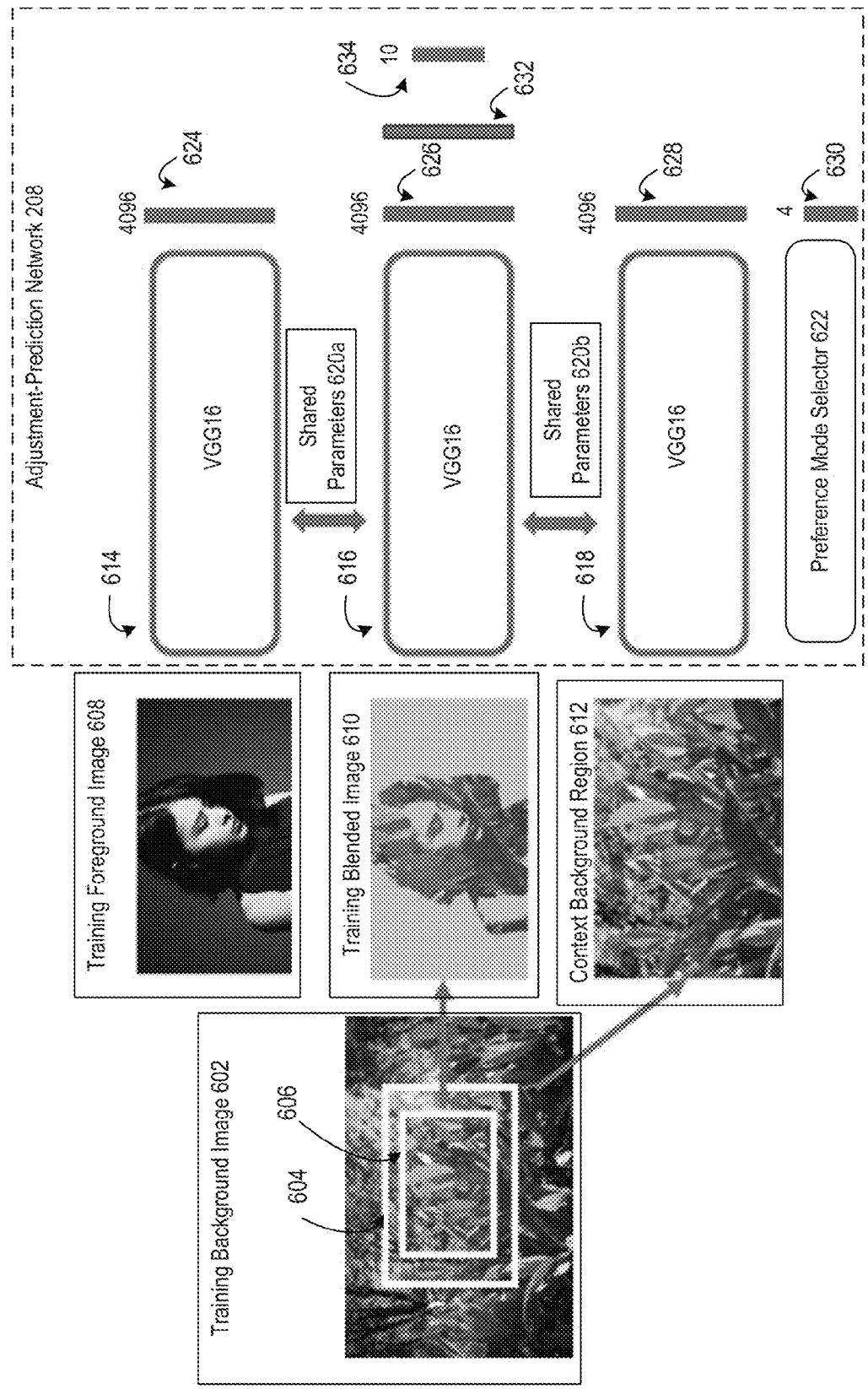
FIG. 6 depicts an example of the adjustment-prediction network of FIG. 2, according to certain embodiments of the present disclosure.

Example of Adjustment-prediction Network for
Generating Alignment or Photometric Adjustments FIG. 6 depicts an example of the adjustment-prediction network of 208. In this example, the adjustment-prediction network 208 is a Siamese network having three branches of VGG networks 614, 616, and 618. The three VGG networks 614, 616, and 618 use shared parameters 620a, 620b (e.g., the same weights shared among all three networks). The adjustment-prediction network 208 depicted in FIG. 6 receives, as inputs, a training foreground image 608, a training blended image 610 with respect to a target background region (e.g., a currently selected background region), and a context background region 612 that is an enlarged portion of the background image as compared to the current target background region. The three VGG networks 614, 616, and 618 output, respectively, image feature vectors 624, 626, and 628 (e.g., 4096-dimensional feature vectors). A middle layer 632 concatenates or otherwise combines the image feature vectors 624, 626, and 628. A classifier layer 634 outputs a set of actions, such as a 10-dimensional representing 10 possible adjustment actions on which the adjustment-prediction network 208 is trained.

In embodiments involving different preference modes, the adjustment-prediction network 208 also receives, via a preference mode selector 622, an identifier of a preference mode. The preference mode identifier is used by the adjustment-prediction network 208 to select the appropriate preference mode from a multiple-choice reward network 219. In this example, the selected preference mode is one-hot encoded into a vector 630 (e.g., into a 4-dimensional vector). The vector 630 is concatenated with other image feature vectors 624, 626, and 628 at a first fully connected layer, such as a layer 632 to which all three of the VGG networks 614, 616, and 618 are connected.

The context background region 612 is a portion 604 of a training background image 602 that is enlarged as compared to a portion 606 of the training background image 602 that is used as the target background region (e.g., 1.3 times larger than the target background region). Using an enlarged portion 606 as the context background region 612 can allow the adjustment-prediction network 208 to evaluate one or more portions of the background image that are outside the target background region. This evaluation allows the adjustment-prediction network 208 to identify potential directions of movement for optimizing the expected reward.

In some embodiments, the training engine 218 executes a deep reinforcement learning agent that trains the adjustment-prediction network 208 to predict an action that would result in a maximized (or otherwise desirable) blending reward score for the foreground image and the background image in accordance with the identified blending engine and preference mode. In one example, the adjustment-prediction network 208 outputs ten scalar values that indicate the reward advantage after taking the selected action. The training engine 218 performs the action with the highest action value and gets an immediate reward that suggests the blending quality changes. The goal of the deep reinforcement learning agent is to learn a policy for maximizing the expected accumulated future award.

The adjustment-prediction network 208 is used for generating visually appealing double exposure effects by predicting the background alignment region and the photometric adjustment parameters. The adjustment-prediction network 208 is trained to accomplish this objective using the reward network 219. For instance, a background image can contain scene elements of different textures and colors. Alignment of background elements with a foreground object can have a significant impact on the result of a blending operation. Furthermore, the blending operation applies a numerical function to one or more pairs of pixels, where a pair of pixels includes two pixel values from foreground and background. Thus, adjusting photometric parameters (e.g., brightness, contrast, and color modification) of a foreground image can affect the visibility of different regions in the photos. Training the adjustment-prediction network 208 with the reward network 219 can allow the adjustment-prediction network 208 to select a combination of alignment and adjustment parameters that balance content preservation and interestingness.

Training the adjustment-prediction network 208 with the reward network 219 can also provide processing efficiencies. For instance, a method of predicting background regions with an image manipulation application is to use a multi-scale sliding window that searches for the best regions of the background image to blend with the foreground image. But this method could be extremely time-consuming if an image manipulation application, for each bounding box, must blend the image with the selected region and pass the blended image through the reward network 219. To accelerate this process, the training engine 218 uses reinforcement learning to search for the suitable background regions in a more efficient manner.

In one example, the training engine 218 uses ten actions to modify a current bounding box and thereby create a modified bounding box. The set of actions includes alignment actions, such as a "Right" movement that moves the current bounding box to the right, a "Left" movement that moves the current bounding box to the left, an "Up" movement that moves the current bounding box upward, a "Down" movement that moves the current bounding box downward, a "Bigger" operation that increases one or more dimensions of the current bounding box, and a "Smaller" operation that decreases one or more dimensions of the current bounding box. The set of actions also includes photometric adjustment actions, such as an "Increase Brightness" action that increases the brightness of the target background region, a "Decrease Brightness" action that decreases the brightness of the target background region, an "Increase Contrast" action that increases the contrast of the target background region, and a "Decrease Contrast" action that decreases the contrast of the target background region.

In some embodiments, each action from the set of actions involves a relative modification, where a modification to a particular action value for an action in one step is obtained by scaling or incrementing a previously computed action value from a previous step. In one example, an "Increase Brightness" action involves increasing the pixel values of the target background region for a ratio $\beta$ (e.g., 0.05). In another example, a "Right" movement involves moving the target background region for $\alpha \times w$, where w is the width of the current target background region and the multiplier $\alpha$ is set to a particular increment (e.g., 0.05).

For each time step (i.e., a defined increment used by the training engine 218), the training engine 218 selects an action from the set of available actions. The training engine 218 selects the action based on the action having a maximum action value. The maximum action value is predicted by the adjustment-prediction network 208. Different adjustment-prediction networks 208 can be responsible to predict different parameters. For instance, an adjustment-prediction network 208 is used to predict one or more background regions that could generate a particular score (e.g., the highest score) with respect to the reward network 219.

In the training process, the training engine 218 randomly selects different foreground images and background images for simulation over different values of time t. In one example, each iteration of the training process involves the training engine 218 selecting a training background image and a training foreground image. The training engine 218 generates a first training blended image by applying a first training adjustment action to the training background image (e.g., extracting a target blending region using certain bounding box parameters and photometric adjustments, then blending the target blending region with the training foreground image). The training engine 218 computes a second training adjustment action by scaling or incrementing one or more adjustments from the first training adjustment action. For instance, the size of the bounding box from the first adjustment action may be scaled by 0.5 or a position of the bounding box from the first adjustment action may be moved rightward. The training engine 218 generates a second training blended image by applying a second training adjustment action to the training background image (e.g., extracting a target blending region using certain bounding box parameters and photometric adjustments, then blending the target blending region with the training foreground image).

For each action taken by the adjustment-prediction network 208, a training reward is provided by the trained reward network 219 shown in FIG. 4. In the example above, the training engine 218 computes, with the reward network, a first blending reward for the first training blended image and a second blending reward for the first training blended image. The training engine 218 computes a step reward value from the first training blending reward and the second training blending reward.

An example of the step reward value is a blending reward difference after performing the selected action, as presented in the following equation:

$$R_t = S(F_t, B_t) - S(F_{t-1}, B_{t-1}). \quad (6)$$

In Equation (6), $R_t$ is the reward value at step t, $S(\cdot)$ is the reward network 219, F is the foreground image, and $B_t$ is the resultant blended image at step t. The training engine 118 can update, during the training process, a table that includes blending rewards for each step (e.g., blending rewards computed using a trained reward network 219) as well as step reward values computed using Equation (6) or another suitable step reward function.

In the training process, the training engine 218 provides a positive reward to encourage a behavior in which a selected action at time t increases the score as compared to an action previously selected at time t−1. Conversely, the training engine 218 provides a negative reward to discourage a behavior in which a selected action at time t decreases the score as compared to an action previously selected at time t−1. In some embodiments, the training process is set to a maximum number of steps t (i.e., a maximum number of actions that are randomly selected), thereby causing the training process to terminate based on reaching the maximum number of steps. Encouraging a behavior, discouraging a behavior, or both can include modifying one or more shared parameters of the subnets within the adjustment-prediction network 208. For instance, the training engine 218 can modify the adjustment-prediction network 208 by performing one or more adjusting weights applied to different nodes, inserting or removing layers within the subnets, inserting or removing connections between nodes in different layers, etc.

In some embodiments, a selected action could result in an out-of-bound condition, which involves moving to a target background region that would fall outside the background image (e.g., a "Left" movement that extends past the left border of the background image). If a selected action having the best blending reward score results in an out-of-bound condition, the training engine 218 selects the action having the second-best blending reward score instead. If the second action also results in an out-of-bound condition, the training engine 218 selects the action having the third-best blending reward score, and so on.

In some embodiments, the training engine 218 is used to train multiple adjustment-prediction networks 208, where each adjustment-prediction network 208 is trained to optimize a different set of blending parameters. In additional or alternative embodiments, optimization techniques are used to search in the parameter space. For example, the training engine 218 can use grid search or annealing algorithms to perform one or more optimizations (e.g., training actions) described above.

One example of a suitable deep reinforcement learning agent for the training engine 218 is described in Z. Wang et al., "Dueling Network Architectures for Deep Reinforcement Learning," ICML 2016, which is incorporated by reference herein.

Example of a Computing System for Computing Adjustments to Blending Parameters

Figure 7:
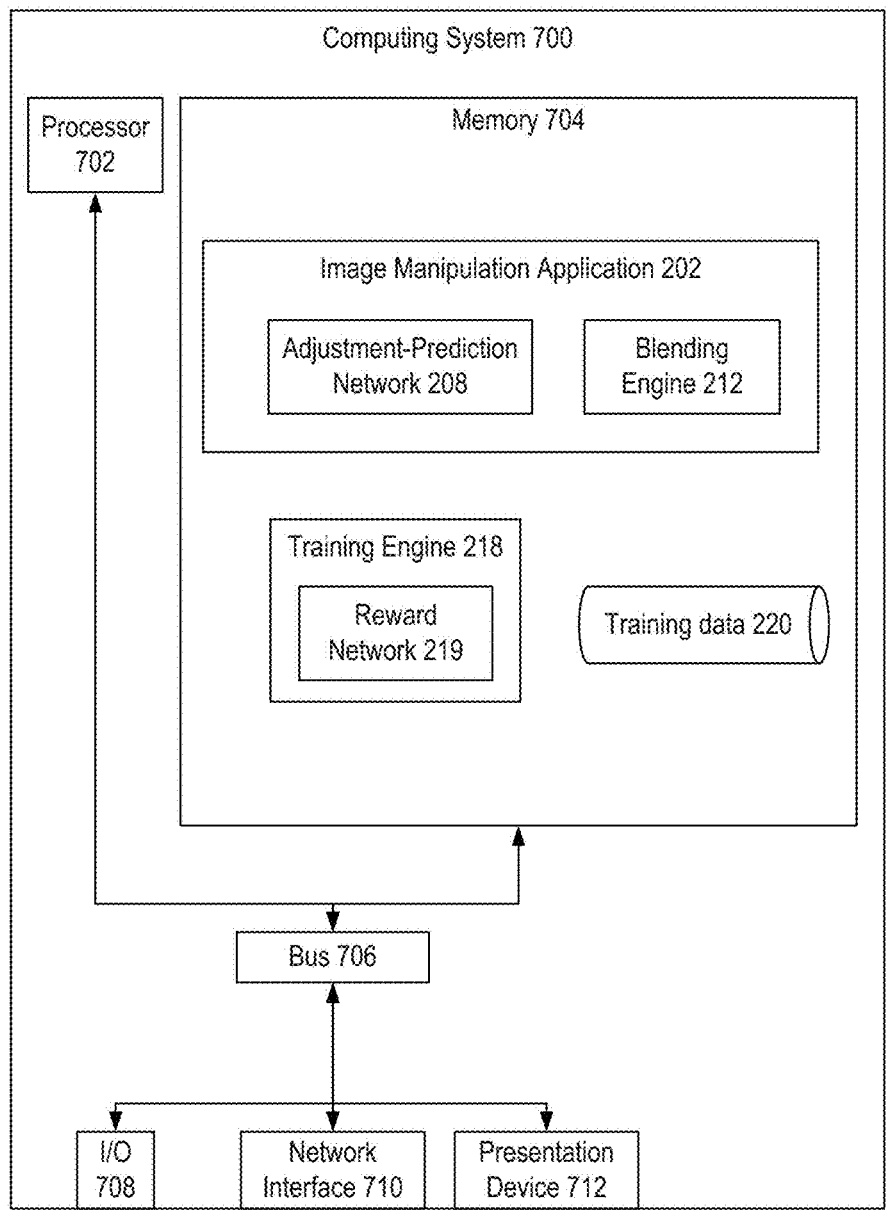
FIG. 7 depicts an example of a computing system for performing various operations described herein, according to certain embodiments of the present disclosure.

Any suitable computing system or group of computing systems can be used for performing the operations described herein. FIG. 7 depicts an example of a computing system 700 for performing various operations described herein, according to certain embodiments of the present disclosure. In some embodiments, the computing system 700 executes the image manipulation application 202 and the training engine 218, as depicted in FIG. 7. In other embodiments, separate computing systems having devices similar to those depicted in FIG. 7 (e.g., a processor, a memory, etc.) separately execute the image manipulation application 202 and the training engine 218.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the image manipulation application 202, the blending engine 212, the training engine 218, or other suitable applications that perform one or more operations described herein. The program code may be resident in the memory device 704 or any suitable computer-readable medium and may be executed by the processor 702 or any other suitable processor. In some embodiments, both the image manipulation application 202 and the training engine 218 are stored in the memory device 704, as depicted in FIG. 7. In additional or alternative embodiments, one or more of the training engine 218 and the image manipulation application 202 are stored in different memory devices of different computing systems. In additional or alternative embodiments, the program code described above is stored in one or more other memory devices accessible via a data network.

The computing system 700 can access one or more of the adjustment-prediction network 208, the reward network 219, and the training data 220 in any suitable manner. In some embodiments, some or all of one or more of these data sets, models, and functions are stored in the memory device 704, as in the example depicted in FIG. 7. For example, a computing system 700 that executes the training engine 218 can provide access to one or more of the adjustment-prediction network 208, the reward network 219, and the training data 220 by external systems that execute the image manipulation application 202.

In additional or alternative embodiments, one or more of these data sets, models, and functions are stored in the same memory device (e.g., one of the memory device 704). For example, a common computing system, such as the creative apparatus 104 depicted in FIG. 1, can host the training engine 218 and the image manipulation application 202 as well as the adjustment-prediction network 208, the reward network 219, and the training data 220. In additional or alternative embodiments, one or more of the programs, data sets, models, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing an image manipulation application 202) via a data network using the network interface device 710.

In some embodiments, the computing system 700 also includes the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing system 700 using one or more data networks described herein. Other aspects can omit the presentation device 712.

Examples of Experimental Results

Figure 8:
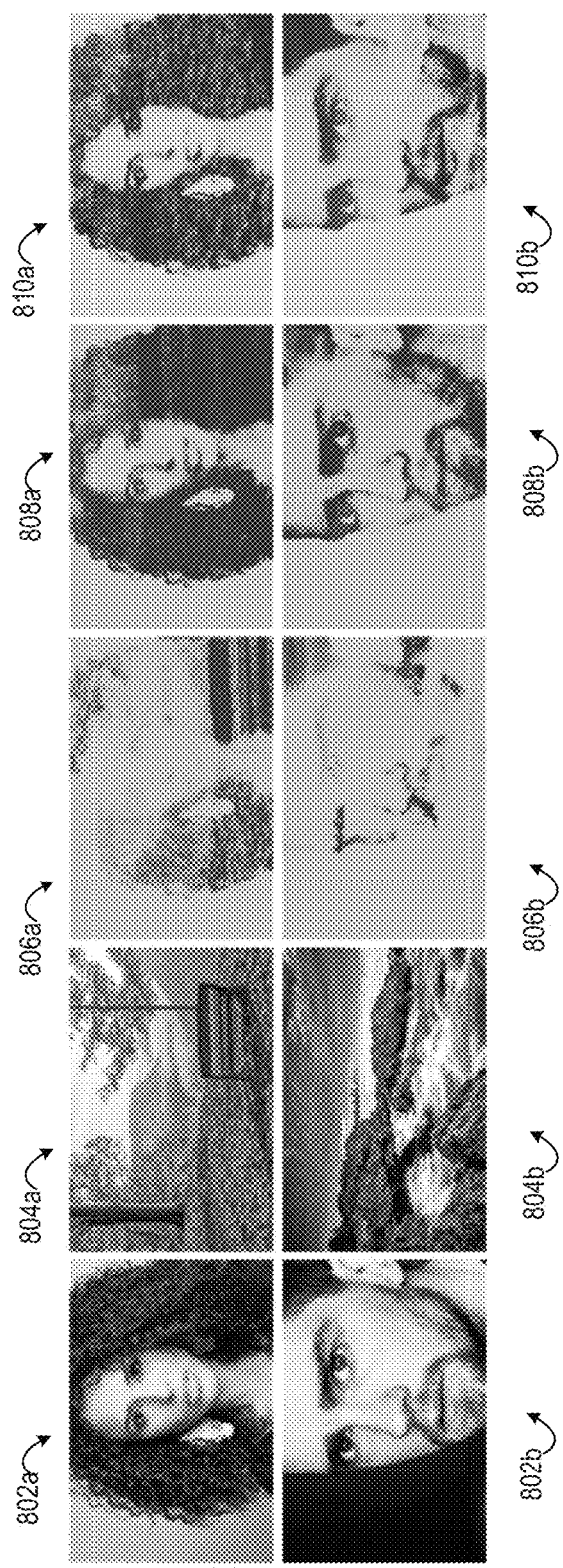
FIG. 8 depicts an example that compares image blending results generated using an adjustment-prediction network with image blending results generated from existing image blending workflows, according to certain embodiments of the present disclosure.

FIG. 8 depicts results from experiments involving certain embodiments of the automated image blending described herein. In these examples, a foreground image 802*a* is blended with a background image 804*a*, and a foreground image 802*b* is blended with a background image 804*b*. A blended image 806*a* shows the result of a blending operation applied to the foreground image 802*a* and the background image 804*a*, and the blended image 806*b* shows the result of a blending operation applied to the foreground image 802*b* and the background image 804*b*. The blended images 806*a* and 806*b* are generated in a randomized manner without using embodiments described herein. As depicted in FIG. 8, these randomized operations fail to preserve large amounts of semantic content from the foreground images 802*a* and 802*b*. This result shows that the task for photo blending is not trivial, as random alignment usually does not result in appealing results.

By contrast, a blended image 808*a* shows the result of a blending operation applied to the foreground image 802*a* and the background image 804*a*, and the blended image 808*b* shows the result of a blending operation applied to the foreground image 802*b* and the background image 804*b*. The blended images 808*a* and 808*b*, which are generated using embodiments described herein, preserve semantic content from the foreground images 802*a* and 802*b* while also introducing aesthetically interesting blended content. The blended images 808*a* and 808*b*, which are generated from an automated blending process in accordance with certain embodiments described herein, have blending qualities similar to the blended images 810*a* and 810*b*. The blended images 810*a* and 810*b* are manually generated based on user inputs to an image manipulation application from expert artists.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for blending images using alignment or photometric adjustments computed by a neural network, wherein the method includes one or more processing devices performing operations comprising:
    accessing, from a memory device, a foreground image and background image data that includes or is computed from a background image;
    providing the foreground image and the background image data to an adjustment-prediction network, wherein:
        (i) the adjustment-prediction network is trained, with a reward network, to compute one or more of training alignment adjustments and training photometric adjustments that optimize a training blending reward score,
        (ii) the training blending reward score is computed by applying the reward network to an image blending result, and
        (ii) the image blending result is generated by blending a training foreground image with a training background image having the one or more of the training alignment adjustments and the training photometric adjustments;
    computing an adjustment action by applying the adjustment-prediction network to the foreground image and the background image data, the adjustment action comprising one or more of an alignment adjustment and a photometric adjustment with respect to the background image data;
    extracting a target background region from the background image data by applying the adjustment action to the background image data;
    blending the target background region with the foreground image; and
    outputting a blended image generated by blending the target background region with the foreground image.

2. The method of claim 1, wherein applying the adjustment action comprises applying the alignment adjustment, wherein the alignment adjustment comprises selecting a placement of a bounding box with respect to the background image data, wherein the bounding box defines boundaries of the target background region.

3. The method of claim 1, wherein applying the adjustment action comprises applying the photometric adjustment, wherein the photometric adjustment comprises modifying one or more of a brightness and contrast of the target background region as compared to the background image data.

4. The method of claim 1, the operations further comprising training the adjustment-prediction network with the reward network, wherein training the adjustment-prediction network with the reward network comprises:
    selecting the training background image and the training foreground image;
    iteratively performing training operations comprising:
        generating a first training blended image by applying a first training adjustment action to the training background image, wherein the first training adjustment includes one or more of a first alignment adjustment and a first photometric adjustment,
        computing a second training adjustment action by incrementing or scaling one or more of the first alignment adjustment and the first photometric adjustment,
        generating a second training blended image by applying the second training adjustment action to the training background image,
        computing, with the reward network, a first training blending reward for the first training blended image and a second training blending reward for the first training blended image,
        computing a step reward value from the first training blending reward and the second training blending reward, and
        modifying the adjustment-prediction network based on the step reward value; and
    outputting the adjustment-prediction network as modified by the iteratively performed training operations.

5. The method of claim 4, the operations further comprising training the reward network, wherein the adjustment-prediction network is trained with the reward network as trained, wherein training the reward network comprises:
    selecting training data comprising:
        a first training label, a first training blending image, and a first training foreground image, wherein the first training blending image comprises first blended image content from the first training foreground image and a first training background image, and
        a second training label, a second training blending image, and a second training foreground image, wherein the second training blending image comprises second blended image content from the second training foreground image and a second training background image;
    computing, with the reward network:

a first training score from the first training blending image and the first training foreground image, and a second training score from the second training blending image and the second training foreground image;

performing a determination that the first training score indicates a lower quality of blending as compared to the second training score and that the second training label indicates a lower quality of blending as compared to the first training label;

updating, based on the determination, the reward network;

computing, with the reward network as updated:
  a first updated training score from the first training blending image and the first training foreground image, and
  a second updated training score from the second training blending image and the second training foreground image; and performing a determination that the first updated training score indicates a higher quality of blending as compared to the second updated training score and that the first training label indicates a higher quality of blending as compared to the second training label.

6. The method of claim 5, wherein selecting the training data comprises:

accessing a set of training labels comprising a first subset of training labels lacking the first and second training labels and a second subset of training labels having the first and second training labels;

identifying a preference mode for training the reward network; and selecting the second subset of training labels rather than the first subset of training labels based on the second subset of training labels having the first and second training labels.

7. The method of claim 5, wherein computing a particular blending score comprises:

encoding, with a first subnetwork of the adjustment-prediction network, a particular training blending image into a first vector;

encoding, with a second subnetwork of the adjustment-prediction network, a particular training foreground image into a second vector;

concatenating the first vector and the second vector into a common feature vector; and applying a classification layer of the reward network to the common feature vector, wherein an output of the classification layer indicates a particular blending reward.

8. The method of claim 1, wherein the adjustment-prediction network is trained, with the reward network, to compute the one or more of training alignment adjustments and the training photometric adjustments that optimize the training blending reward score for a first preference mode and to compute one or more of different training alignment adjustments and different training photometric adjustments that optimize the training blending reward score for a second preference mode, wherein the operations further comprise receiving an indicator of the first preference mode, wherein computing the adjustment action by applying the adjustment-prediction network to the foreground image and the background image data comprises:

encoding, with a first subnetwork of the adjustment-prediction network, the foreground image into a first vector, encoding, with a second subnetwork of the adjustment-prediction network, an initial blended image included in the background image data into a second vector, wherein the initial blended image comprises blended image content from (i) the foreground image and (ii) a portion of the background image specified by an initial bounding box, encoding, with a third subnetwork of the adjustment-prediction network, a background context region into a third vector, wherein the background context region is included in the background image data and comprises an additional portion of the background image that is larger than the portion of the background image used to generate the initial blended image, encoding the indicator of the first preference mode into a fourth vector, concatenating the first vector, the second vector, the third vector, and the fourth vector into a common feature vector, and applying a classification layer of the adjustment-prediction network to the common feature vector, wherein the adjustment action is indicated by an output of the classification layer.

9. A system comprising:

a processing device; and a non-transitory computer-readable medium communicatively coupled to the processing device, wherein the processing device is configured to execute program code stored in the non-transitory computer-readable medium and thereby perform operations comprising:

providing, to an adjustment-prediction network, a foreground image and background image data that includes or is computed from a background image, wherein:
  (i) the adjustment-prediction network is trained, with a reward network, to compute one or more of training alignment adjustments and training photometric adjustments that optimize a training blending reward score,
  (ii) the training blending reward score is computed by applying the reward network to an image blending result, and
  (ii) the image blending result is generated by blending a training foreground image with a training background image having the one or more of the training alignment adjustments and the training photometric adjustments, computing an adjustment action by applying the adjustment-prediction network to the foreground image and the background image data, the adjustment action comprising one or more of an alignment adjustment and a photometric adjustment with respect to the background image data, extracting a target background region from the background image data by applying the adjustment action to the background image data, blending the target background region with the foreground image, and outputting a blended image generated by blending the target background region with the foreground image.

10. The system of claim 9, wherein applying the adjustment action comprises applying the alignment adjustment, wherein the alignment adjustment comprises selecting a placement of a bounding box with respect to the background image data, wherein the bounding box defines boundaries of the target background region.

11. The system of claim 9, wherein applying the adjustment action comprises applying the photometric adjustment, wherein the photometric adjustment comprises modifying one or more of a brightness and contrast of the target background region as compared to the background image data.

12. The system of claim 9, the operations further comprising training the adjustment-prediction network with the reward network, wherein training the adjustment-prediction network with the reward network comprises:
 selecting the training background image and the training foreground image;
 iteratively performing training operations comprising:
  generating a first training blended image by applying a first training adjustment action to the training background image, wherein the first training adjustment includes one or more of a first alignment adjustment and a first photometric adjustment,
  computing a second training adjustment action by incrementing or scaling one or more of the first alignment adjustment and the first photometric adjustment,
  generating a second training blended image by applying the second training adjustment action to the training background image,
  computing, with the reward network, a first training blending reward for the first training blended image and a second training blending reward for the first training blended image,
  computing a step reward value from the first training blending reward and the second training blending reward, and
  modifying the adjustment-prediction network based on the step reward value; and
 outputting the adjustment-prediction network as modified by the iteratively performed training operations.

13. The system of claim 12, the operations further comprising training the reward network, wherein the adjustment-prediction network is trained with the reward network as trained, wherein training the reward network comprises:
 selecting training data comprising:
  a first training label, a first training blending image, and a first training foreground image, wherein the first training blending image comprises first blended image content from the first training foreground image and a first training background image, and
  a second training label, a second training blending image, and a second training foreground image, wherein the second training blending image comprises second blended image content from the second training foreground image and a second training background image;
 computing, with the reward network:
  a first training score from the first training blending image and the first training foreground image, and
  a second training score from the second training blending image and the second training foreground image;
 performing a determination that the first training score indicates a lower quality of blending as compared to the second training score and that the second training label indicates a lower quality of blending as compared to the first training label;
 updating, based on the determination, the reward network;
 computing, with the reward network as updated:
  a first updated training score from the first training blending image and the first training foreground image, and
  a second updated training score from the second training blending image and the second training foreground image; and
 performing a determination that the first updated training score indicates a higher quality of blending as compared to the second updated training score and that the first training label indicates a higher quality of blending as compared to the second training label.

14. The system of claim 13, wherein selecting the training data comprises:
 accessing a set of training labels comprising a first subset of training labels lacking the first and second training labels and a second subset of training labels having the first and second training labels;
 identifying a preference mode for training the reward network; and
 selecting the second subset of training labels rather than the first subset of training labels based on the second subset of training labels having the first and second training labels.

15. The system of claim 13, wherein computing a particular blending score comprises:
 encoding, with a first subnetwork of the adjustment-prediction network, a particular training blending image into a first vector;
 encoding, with a second subnetwork of the adjustment-prediction network, a particular training foreground image into a second vector;
 concatenating the first vector and the second vector into a common feature vector; and
 applying a classification layer of the reward network to the common feature vector, wherein an output of the classification layer indicates a particular blending reward.

16. The system of claim 9, wherein the adjustment-prediction network is trained, with the reward network, to compute the one or more of training alignment adjustments and the training photometric adjustments that optimize the training blending reward score for a first preference mode and to compute one or more of different training alignment adjustments and different training photometric adjustments that optimize the training blending reward score for a second preference mode,
 wherein the operations further comprise receiving an indicator of the first preference mode,
 wherein computing the adjustment action by applying the adjustment-prediction network to the foreground image and the background image data comprises:
  encoding, with a first subnetwork of the adjustment-prediction network, the foreground image into a first vector,
  encoding, with a second subnetwork of the adjustment-prediction network, an initial blended image included in the background image data into a second vector, wherein the initial blended image comprises blended image content from (i) the foreground image and (ii) a portion of the background image specified by an initial bounding box,
  encoding, with a third subnetwork of the adjustment-prediction network, a background context region into a third vector, wherein the background context region is included in the background image data and comprises an additional portion of the background image that is larger than the portion of the background image used to generate the initial blended image, encoding the indicator of the first preference mode into a fourth vector, concatenating the first vector, the second vector, the third vector, and the fourth vector into a common feature vector, and applying a classification layer of the adjustment-prediction network to the common feature vector, wherein the adjustment action is indicated by an output of the classification layer.

17. A non-transitory computer-readable medium having program code that is stored thereon, the program code executable by one or more processing devices for performing operations comprising:

training, with a reward network, an adjustment-prediction network to compute one or more of training alignment adjustments and training photometric adjustments that optimize a training blending reward score, wherein training the adjustment-prediction network with the reward network comprises:

selecting a training background image and a training foreground image;

iteratively performing training operations comprising:

generating a first training blended image by applying a first training adjustment action to the training background image, wherein the first training adjustment includes one or more of a first alignment adjustment and a first photometric adjustment, computing a second training adjustment action by incrementing or scaling one or more of the first alignment adjustment and the first photometric adjustment, generating a second training blended image by applying the second training adjustment action to the training background image, computing, with the reward network, a first training blending reward for the first training blended image and a second training blending reward for the first training blended image, computing a step reward value from the first training blending reward and the second training blending reward, and modifying the adjustment-prediction network based on the step reward value; and outputting, to an image manipulation application, the adjustment-prediction network as modified by the iteratively performed training operations.

18. The non-transitory computer-readable medium of claim 17, the operations further comprising training the reward network, wherein training the reward network comprises:

selecting training data comprising:

a first training label, a first training blending image, and a first training foreground image, wherein the first training blending image comprises first blended image content from the first training foreground image and a first training background image, and a second training label, a second training blending image, and a second training foreground image, wherein the second training blending image comprises second blended image content from the second training foreground image and a second training background image;

computing, with the reward network:

a first training score from the first training blending image and the first training foreground image, and a second training score from the second training blending image and the second training foreground image;

performing a determination that the first training score indicates a lower quality of blending as compared to the second training score and that the second training label indicates a lower quality of blending as compared to the first training label;

updating, based on the determination, the reward network;

computing, with the reward network as updated:

a first updated training score from the first training blending image and the first training foreground image, and a second updated training score from the second training blending image and the second training foreground image; and performing a determination that the first updated training score indicates a higher quality of blending as compared to the second updated training score and that the first training label indicates a higher quality of blending as compared to the second training label.

19. The non-transitory computer-readable medium of claim 18, wherein selecting the training data comprises:

accessing a set of training labels comprising a first subset of training labels lacking the first and second training labels and a second subset of training labels having the first and second training labels;

identifying a preference mode for training the reward network; and selecting the second subset of training labels rather than the first subset of training labels based on the second subset of training labels having the first and second training labels.

20. The non-transitory computer-readable medium of claim 18, wherein computing a particular blending score comprises:

encoding, with a first subnetwork of the adjustment-prediction network, a particular training blending image into a first vector;

encoding, with a second subnetwork of the adjustment-prediction network, a particular training foreground image into a second vector;

concatenating the first vector and the second vector into a common feature vector; and applying a classification layer of the reward network to the common feature vector, wherein an output of the classification layer indicates a particular blending reward.

* * * * *